United States Patent [19]

Haenggi et al.

[11] Patent Number: 5,094,902
[45] Date of Patent: * Mar. 10, 1992

[54] SKID-RESISTANT SURFACE MARKING MATERIAL

[75] Inventors: Robert A. Haenggi; James A. Laird, both of St. Paul, Minn.

[73] Assignee: Minnesota Mining and Manufacturing Company, St. Paul, Minn.

[*] Notice: The portion of the term of this patent subsequent to Jun. 26, 2007 has been disclaimed.

[21] Appl. No.: 515,112

[22] Filed: Apr. 27, 1990

Related U.S. Application Data

[63] Continuation-in-part of Ser. No. 241,318, Sep. 7, 1988, Pat. No. 4,937,127.

[51] Int. Cl.⁵ .................................. B32B 5/16
[52] U.S. Cl. ............................. 428/150; 428/149
[58] Field of Search ............... 428/148, 149, 150, 212, 428/328, 325, 143

[56] References Cited

U.S. PATENT DOCUMENTS

| | | | |
|---|---|---|---|
| 4,020,211 | 4/1977 | Eigenmann | 428/323 |
| 4,117,192 | 9/1978 | Jorgensen | 428/337 |
| 4,248,932 | 2/1981 | Tung et al. | 428/325 |
| 4,490,432 | 12/1984 | Jordan | 428/220 |
| 4,564,556 | 1/1986 | Lange | 428/325 |
| 4,680,230 | 7/1987 | Gibb et al. | 428/403 |
| 4,937,127 | 6/1990 | Haenggi et al. | 428/149 |

FOREIGN PATENT DOCUMENTS

| | | |
|---|---|---|
| 1002803 | 1/1977 | Canada . |
| 206670 | 12/1986 | European Pat. Off. . |
| 2927362 | 1/1981 | Fed. Rep. of Germany . |
| 60-130660 | 7/1985 | Japan . |
| 541674 | 11/1973 | Switzerland . |

Primary Examiner—Alexander S. Thomas
Attorney, Agent, or Firm—Gary L. Griswold; Walter N. Kirn; David B. Kagan

[57] ABSTRACT

A skid-resistant, surface marking material is disclosed. The skid-resistant, surface marking material comprises a polymer matrix phase and a plurality of opaque ceramic spheroids partially embedded in and protruding from the top surface of the matrix layer. The ceramic spheroids have rounded surfaces and no substantial points.

7 Claims, 3 Drawing Sheets

SKID-RESISTANT SURFACE MARKING MATERIAL

This is a continuation-in-part of application Ser. No. 07/241,318, filed Sept. 7, 1988, U.S. Pat. No. 4,937,127.

FIELD OF THE INVENTION

This invention relates to skid-resistant surface marking materials, and in particular to skid-resistant surface marking materials having ceramic spheroids embedded in, and partially protruding from, the top surface of such materials.

BACKGROUND OF THE INVENTION

The present invention relates to the use of particles to prevent skidding and in particular to the prevention of skidding on pavement marking sheets.

Pavement marking sheets or tapes are well known to convey information to drivers of motor vehicles and pedestrians. The marking sheets typically have a highly visible color and often employ retroreflective particles for nighttime use.

Representative of pavement-marking sheet materials are Jorgensen U.S. Pat. No. 4,117,192 (disclosing irregularly-shaped, skid-resistant particles); Tung U.S. Pat. No. 4,248,932 (disclosing skid-resistant, irregular or angular shaped inorganic particles, and optionally retroreflective spheres, scattered over the surface as being more skid-resistant than dense packed particles). The disclosed sheet material has a skid-resistance of at least 55 BPN); and Lange U.S. Pat. No. 4,758,469 (disclosing an embossed retroreflecting pattern on a marking tape with optional embedded skid-resisting particles).

Anti-skid properties are desirable on many surfaces and are particularly desirable in pavement marking tapes in order to reduce slipping by pedestrians, bicycles, and vehicles upon the tapes. Several European governments have specified desirable levels of skidresistance properties for pavement marking sheet materials. The specifications call for a minimum level of initial skid-resistance and retention of a significant level of skid-resistance "in use". When installed upon a pavement surface, (i.e. "in use"), the marking tapes are subjected to an environment which is quite severe.

In the pavement marking industry, skid-prevention properties are typically imparted by embedding hard, crystalline particles with sharp points on an upper surface of the pavement marking tape. Typical examples of such conventionally employed particles include corundum (aluminum oxide) and quartz (sand, silicon dioxide, or micronized quartz). These particles are capable of achieving relatively good initial skid-resistance. However, the initial skid-resistance begins to decrease rapidly once the marking tape is exposed to traffic. Specifically, the impact of tires, the abrasion of loose dirt and sand, and the corrosion of salt and water contribute to loss of skid-resistance. The loss of skid-resistance is typically caused by some combination of at least one of two mechanisms. First, the crystalline materials have a tendency to fracture along crystalline planes. Second, the particles may become loosened from the embedding matrix.

One type of pavement marking tape, which employs a tough, durable top layer which resists wear or ablating and includes partially embedded crystalline particles to impart skid-resistance is disclosed in Ludwig Eigenmann U.S. Pat. No. 4,020,211. The Eigenmann product is a pavement marker with a plurality of particles bonded to a layer and projecting outwardly. The particles have a minimum hardness of about 6 on the Mohs Hardness Scale and include a pointed end portion projecting outwardly for imparting good anti skid properties. However, poor retention of acceptable skid-resistance in use has been observed.

An alternative product attempts to counter the above mechanisms by providing an ablative pavement marking sheet which has crystalline particles distributed throughout the thickness of the marking sheet, thereby continuously exposing fresh skid-resistant particles as the marking sheet wears. One drawback to the ablative marking tapes is maintaining an acceptable and informative color "in use", since ablative materials are typically soft and tend to become embedded with dirt. (See U.S. Pat. No. 4,490,432).

Other particles, previously unknown to the pavement marking industry, have been used as proppants in oil well hydraulic fracturing to improve pumping production. Such particles are described, for example, in U.S. Pat. No. 4,680,230. These particles typically comprise a vitreous matrix phase and a crystalline phase. The particles generally are characterized by a Krumbein roundness of at least 0.8 (1.0 representing a perfect sphere) and are highly chemically stable.

Canadian Patent No. 1002803 discloses an iron paving slab with recesses into which a binder and pulverized material, such as a ceramic is coated.

Japanese Patent No. 60130660 discloses a melt application type non-slip material which is filled with ceramic aggregate of baked silica, alumina, or clay and pigments Swiss Patent No. 541674, another Eigenmann patent, discloses the use of globules of a binding material containing corundum (Aluminum Oxide).

West German Patent No. 2927362 discloses a material for abrasion resistant surfaces comprising glass powder embedded in a polymer matrix.

SUMMARY OF THE INVENTION

We have discovered that spheroidal, crush-resistant ceramic spheroids originally developed for use as proppants in the hydraulic fracturing method of increasing oil well production impart improved skid-resistance when partially embedded in a surface of a matrix layer. The particles also demonstrate excellent particle retention in comparison with conventional pointed skid-resistance particles presently employed in the pavement marking industry. Further, the use of these particles allows the surface to retain a surprisingly high level of skid-resistance over a long period of time.

Our discovery of a novel use for these ceramic spheroids as anti-skid particles allows the production of highly skid-resistant surface marking materials. The surface marking materials of the present invention include a matrix layer and a plurality of durable, ceramic spheroids partially embedded in and protruding from the matrix layer. Preferred embodiments of the skid-resistant marking materials retain a high level of skid-resistance while exposed to severe road environment conditions for a surprisingly long time. Additionally, the spherical particles can be custom colored or coated to match the color of pavement marking tape.

DETAILED DESCRIPTION OF THE PREFERRED EMBODIMENTS

Figure 1:
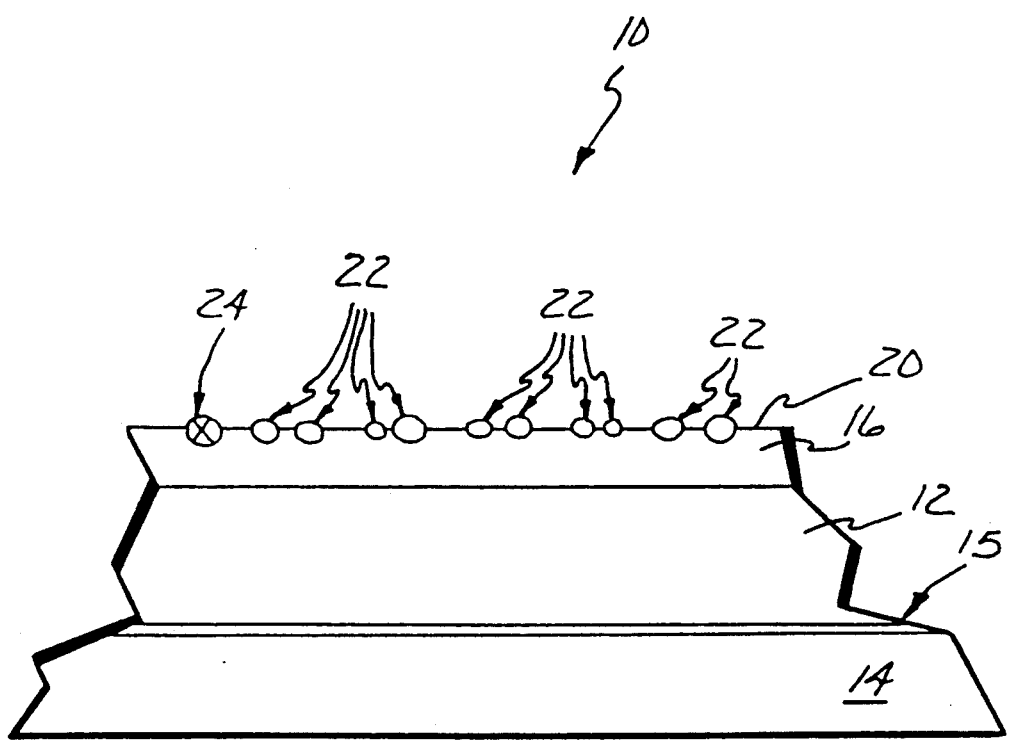
FIG. 1 is a cross sectional view of a pavement marking sheet of the present invention.

Referring now to FIG. 1, there is shown a preferred embodiment of the present invention. A pavement marking material 10 includes a base sheet 12 in contact with a pavement surface 14. Optionally, a fine layer of adhesive material 15 may be interposed between the base sheet 12 and the pavement 14. The base sheet 12 may be prepared, for example, from a mixture as previously disclosed in the Jordan Patent, U.S. Pat. No. 4,490,432. Preferably, a portion of polyester fibers, may be included in the mixture. In this method, a mixture including such fibers is formed and then calendered into sheet form.

A polymer matrix layer 16 is coated upon the underlying base sheet 12. The polymer matrix layer 16 has an uppermost or top surface 20. In a pavement marking sheet 10, the uppermost or top surface 20 may be described as that surface which would contact a vehicle tire or the bottom surface of a pedestrian's foot. In FIG. 1, the top surface 20 is shown with a relatively smooth, continuous surface. However, the top surface 20 need not be limited to a smooth, continuous surface but rather may be adapted to facilitate rapid drainage of water. For example, the top surface 20 may be an embossed or patterned surface. Additionally, the top surface 20 may optionally include retroreflective beads 24 or other equivalent materials commonly associated with pavement marking materials.

Suitable material for the matrix layer 16 may be either a thermoplastic or thermosetting polymeric binder. One such binder is a vinyl-based thermoplastic resin including a white pigment, as described in U.S. Pat. No. 4,117,192, incorporated herein by reference. Other suitable materials for the matrix layer 16 include a two-part polyurethane formed by reacting polycaprolactone diols and triols with derivatives of hexamethylene diisocyanate; epoxy based resins as described in U.S. Pat. No. 4,248,932; U.S. Pat. No. 3,436,359; and U.S. Pat. No 3,580,887; and blocked polyurethane compositions as described in U.S. Pat. No. 4,530,859. Also suitable as a material for the matrix layer 16 are polyurethane compositions comprised of a moisture activated curing agent and a polyisocyanate prepolymer. The moisture activated curing agent is preferably an oxazolidene ring. Such compositions are described in U.S. Pat. No. 4,381,388.

One preferred polyurethane material is formed by first reacting two equivalents of methylene bis (4-cyclohexyl isocyanate) ($H_{12}MDI$) with one equivalent of a polycaprolactone triol of molecular weight about 540 and hydroxyl number about 310 (i.e., a 2-oxypanone polymer with 2-ethyl-2-(hydroxymethyl)-1,3 propanediol) using dibutyltindilaurate as a catalyst. The reaction is carried out in 2-ethoxyethyl acetate and cyclohexanone. To 25 parts of prepolymer is also added 20 parts of a 60/40 pigment dispersion of pigments such as either titanium dioxide or lead chromate in a diglycidyl ether of bisphenol A epoxy resin (a suitable source is Stan-Tone TM 10 EPX03 or 30 EPX03 made by Harwick Chemical Corp. of Akron, Ohio). Zinc 2-ethylhexanoate catalyst is added to the liquid mixture shortly before coating or applying the liquid mixture to the base sheet 12. Inclusion of up to about 10% 2,4 pentanedione in the preferred bead bond extends the pot life of the coating mixture from about 1.5 hours to about 15 hours.

Another preferred polyurethane material is described in Assignee's copending application, Harper et al., Ser. No. 07/504,951, filed Apr. 5, 1990, for Pavement Marking Material. This polyurethane is capable of undergoing brittle fracture at a temperature from 0° C. to 45° C. such that when the base sheet conforms to an irregular surface, the polyurethane top layer readily forms ruptures to relieve stress build-up in the top layer as the regions of the top layer defined by the ruptures remain adhered to, and follow the conformance of, the base sheet. Preferred embodiments of this polyurethane have a Young's Modulus from 50,000 psi (350 MPa) to 300,000 psi (2100 MPa) and a percent elongation at break of from 4% to 35%.

Useful ranges of pigment dispersion which may be included in the matrix layer 16 are 10-30 parts per 25 parts of urethane prepolymer. Hydrogenated epoxies may also be employed. Other useful pigments include nacreous pigments (such as lead sulfate) and yellow iron derived pigments. Other pigments typically used for coloring pavement markings may also be used.

Generally, suitable materials for the matrix layer 16, such as described above, are characterized by excellent adhesion to skid-resistant ceramic spheroids 22 which are subsequently partially embedded in the matrix layer 16 prior to curing. Additionally, the material of the matrix layer 16 strongly adheres to the material of the base sheet 12 and is highly cohesive and resistant to environmental weathering.

A plurality of durable, opaque ceramic spheroids 22 are partially embedded in and protrude from the polymer matrix layer 16. The ceramic spheroids 22 impart skid-resistance to the top surface of the polymer matrix layer 16. Suitable ceramic spheroids 22 suitable for use in the practice of the present invention include the ceramic spheroids previously used as proppants in oil well hydraulic fracturing processes. For example, the ceramic spheroids described in U.S. Pat. No. 4,725,390 and 4,680,230 would be suitable for use in the present invention.

The ceramic spheroids 22 of the present invention have rounded surfaces and substantially no points. As compared to previously known skid-resistant particles, the spheroids 22 show significantly less tendency to fracture along crystalline planes or to come loose from the matrix layer 16. Preferably, the ceramic spheroids have a Krumbein roundness of at least about 0.8. A theoretically perfect sphere has a Krumbein roundness of 1.0. The spheroids 22 usually range in size from 0.3 mm in diameter to about 2.0 mm in diameter, more typically from about 0.4mm to about 1.2 mm in diameter, and preferably from about 0.4 to about 1.0 mm in diameter. Alternative screening processes may be employed to produce other ranges of particle diameters.

Preferably, the ceramic spheroids 22 are two phase particles having a vitreous matrix phase and a crystalline phase. In such embodiments, the ceramic spheroids 22 have from 3 to 97 parts by weight, preferably 10 to 90 parts by weight, and more preferably about 50 parts by weight of a vitreous matrix phase. Examples of vitreous materials suitable for use in the present invention include mineral particulates such as nepheline syenite, basalt, feldspar, shale, argillite, pyroxene, and mixtures thereof. Other suitable vitreous materials include clays such as kaolin, talc, bentonite, wollastonite, and mixtures thereof.

The preferred ceramic spheroids 22 also comprise from 3 to 97 parts by weight, preferably from 10 to 90 parts by weight, and more preferably about 50 parts by weight of a crystalline phase. Examples of crystalline materials suitable for use in the present invention include alumina, mullite, and mixtures thereof.

Particularly preferred ceramic spheroids 22 are the proppants described in U.S. Pat. No. 4,680,230, which is incorporated herein by reference. The particles include a high alumina content. The porous core is typically a blend of from 10 to 90% wt. Alumina, preferably a 50—50 blend of crystalline $Al_2O_3$ and vitrified mineral fines, with a higher concentration of alumina near the surface of the spheroid than in the center The particles are also characterized by a Krumbein roundness of about 0.8 or more.

The particularly preferred ceramic spheroids 22 allow for the production of pavement marking sheet materials with surface frictional properties of at least about 45 British Pendulum Number (BPN) as determined by ASTM E303 when exposed to traffic for a substantial period of time in the wheel track on a typical pavement. These particles also may be colored to match the color of pavement marking tapes. The color coated particles are particularly advantageous in that a pavement marking tape including a plurality of protruding skid-resistant particles has a more uniform appearance, which in turn improves the efficiency of an observer in discerning the information to be conveyed by the marking strip.

In the crush resistance test described herein after, the particularly preferred ceramic spheroids 22 typically have less than about 22 wt. % fractured at an applied pressure of approximately 69 MPa, compared to Ottawa sand which typically has about 41 % wt. fractured at about 69 MPa. The particles are essentially insoluble in salt water solutions. The Critical Stress Intensity Factor, a measure of fracture toughness of the particles, $K_{IC}$, can be approximately twice that of sand, being typically more than about 1.5 $Mn/M^{3/2}$ compared to about 0.7 for sand. $K_{IC}$, as explained by B. R. Lawn et al. in J American Ceramics Soc., Vol. 63, p. 574 (1980), is determined by microscopic examination of fractures originating from a diamond imprint on a polished surface of a particle and is calculated as $K_{IC} = 0.028 E^{\frac{1}{2}} H^{-\frac{1}{2}} a^2 c^{-3/2}$, where "E" is the bulk modulus, "H" is the Vicker's hardness, "a" is the length of a diagonal of the diamond imprint and "c" is the length of "a" plus the length of a fracture originating at a corner of the diamond imprint. The Mohs hardness of the particles is typically 7 or higher, similar to that of sand.

The particularly preferred ceramic spheroids 22 may be prepared as follows: a mixture of dry raw materials including a mineral particulate, such as nepheline syenite, and a binder are pelletized in a high energy pelletizing apparatus, by adding water. The resulting wet product is dried, then mixed with a parting agent. Subsequently, the dried pellets and parting agent are fired to cause vitrification to occur.

Machines known as high energy mix pelletizers are best suited for the pellet formation step. Two examples of such machines are the Littleford mixer and the machine known as the Eirich machine. The Eirich machine is described in U.S. Pat. No. 3,690,622 incorporated herein by reference. The Eirich machine comprises basically a rotatable cylindrical container, the central axis of which is at an angle to the horizontal, one or more deflector plates, and at least one rotatable impacting impeller usually located below the apex of the path of rotation of the cylindrical container. The rotatable impacting impeller engages the material being mixed and may rotate at a higher angular velocity than the rotatable cylindrical container itself.

Numerous variations of the particularly preferred ceramic spheroids 22 have also been prepared and are contemplated as part of the subject invention. For example, 3M roofing granule mineral fines of approximately 8 μm diameter or less may be substituted for the nepheline syenite fines. The amount of water employed in the pelletizing step may be increased to provide somewhat more irregular shaped particles. The coarse alumina is preferably employed as a parting agent during the firing step. However, the coarse alumina may be partially or completely replaced by fine calcined alumina or alumina hydrate.

Another example of a two-phase, high alumina content ceramic spheroids suitable in the practice of the present invention are available commercially as Aluma Sand from Diamonite Products Manufacturing, Incorporated, Shreve, Ohio. These particles have a crystalline phase comprising about 85 to 90 parts by weight of alumina. These spheroids are characterized by a spherical shape, a specific gravity of about 3.4, and a Mohs hardness of about 9 or more. These spheroids also exhibit a gas tight porosity and show no water absorption.

Other suitable, two-phase, high alumina content ceramic spheroids are described in Examples 8 and 9, below.

Particles offered commercially by Carbo Ceramics of New Iberia, La. 70560, known as Carbolite and Carboprop are also suitable as durable anti-skid ceramic spheroids 22 in this invention. Suitable spheroids made of clay and bauxite are also sold commercially by Norton-Alcoa. Another source of durable spherical particles which are believed suitable for described in U.S. Pat. No. 4,072,193 and 4,106,947, which are monoclinic and cubic zirconium embedded in a modified aluminosilicate glass. Such particles are available from Messina, Inc. of Dallas, Texas, under the name "Z-prop".

An important parameter for evaluating skid-resistant particles is crush strength or crush resistance. Means for evaluating the crush resistance of the particles are found in American Petroleum Institute Publications such as: "API Recommended Practices for Testing Sand Used in Hydraulic Fracturing Operations" API RP 56, 1st Edition (March 1983) and "API Recommended Practices for Testing High Strength Proppants Used in Hydraulic Fracturing Operations", 3rd Edition (January 1983). Crush resistance is measured by placing a sample of particulate material into a test apparatus with a die cavity having an internal diameter of about 57 mm. The test volume of the particulate sample is equivalent to the volume which would be occupied by 1.95 $g/cm^2$ of 0.85 to 0.425 mm sand in the test cell. A steel plunger or piston applies pressure to the particulate material inside the cavity at a rate of 69 MPa per minute to achieve the test pressure, for example, about 69 MPa, and 2 minutes at total pressure, after which the pressure is released.

Subsequently, the sample is screened between screens having openings of approximately 0.85, 0.425, or 0.297 mm, for 10 minutes on a screen vibrator such as a ROTAP type screen vibrator available from the Taylor division of the Combustion Engineering Company of Ohio, and the percentage of fines less than 0.425 mm in largest dimension is recorded. More crush resistant particulate materials exhibit minimal weight percent fines produced in the crush resistance test.

A pavement marking sheet of this invention may be prepared by first providing a base sheet 12. A face of the base sheet 12 is coated with a liquid polymer matrix material, such as a urethane resin including a catalyst and, optionally, a pigment such as TiO2. A spreading bar may be used to apply the matrix material to the base sheet 12. Next, the ceramic spheroids 22 are embedded in the liquid polymer matrix material by cascading or sprinkling. Subsequently, the polymer matrix material is cured by exposure to moisture and/or heat in an oven to form the matrix layer 16. This solidifies the matrix layer 16 and locks the spheroids 22 into a partially embedded position, thus imparting skid-resistant properties to the top surface of the matrix layer 16.

Alternative embodiments of skid-resistant surfaces of the present invention include sheet materials for application to road surfaces and also lane marking lines. The skid-resistant ceramic spheroids are dropped or cascaded either simultaneously or sequentially with retroreflective materials onto wet paint or hot thermoplastic materials, as described in U.S. Pat. No. 3,849,351, incorporated herein by reference. In each of these alternative embodiments, a matrix is present and serves to hold the crush resistant spheroids in a partially embedded and partially protruding orientation which allows the spheroids to increase friction on the exposed surface. Alternative coating compositions which serve as a matrix and include the skid-resistant ceramic spheroids described herein are also contemplated as included within the scope of the present invention.

The ceramic spheroids could be incorporated into thermoplastic resin marking systems to impart more durable skid-resistance to markings made using such resins In addition to the pavement marking sheet or tape construction previously described, other tape constructions can be made which incorporate and benefit from the use of the above-described ceramic spheroids. In particular, the use of a polyurethane topcoat is not limited to the composition previously disclosed, but could include any of a variety of aliphatic compositions such as those described by Sengupta, Ethen, and Jordan in their patent application U.S. Ser. No. 744,494, filed June 13, 1985; and in their patents U.S. Pat. No. 4,388,359, and U.S. Pat. No. 4,490,432, respectively. Use of particles in conjunction with epoxy coatings and foil backings such as is described in Tung and Frost, U.S. Pat. No. 4,248,932, is also possible.

Possible modifications or equivalents to this invention include the use of skid-resistant ceramic spheroids in tape constructions where the base sheet 12 is replaced by aluminum foil, an impregnated non-woven scrim, or eliminated altogether. The aliphatic polyurethane of the topcoat could be replaced with vinyl, epoxy resin, polyester resin, or polyamide resin.

In addition to the use of these particles in tape constructions, use in durable paint compositions is also envisioned. The durable paints could be two component systems such as epoxies or polyurethanes or may also be drying and curing type paints, such as thermoplastic polyurethanes, alkyds, acrylics, polyesters, or equivalents.

The present invention will now be further described with reference to the following examples.

EXAMPLE 1

White anti-skid particles were prepared as follows:

A dry blend of the following materials, having particle sizes which pass through screen openings of about 45 micrometers, were mixed for about 3 minutes in an Eirich Machine Inc. RV02 Mix Pelletizer:

| Wt. % | Material |
|---|---|
| 50.0 | Calcined Alumina (A-2, Grade −44 μm, from Alcoa Alumina Co., Bauxite, Arkansas) |
| 2.5 | Bentonite clay (VOLCLAY 200, from American Colloid Co., Skokie, IL) |
| 47.5 | NEPHELINE SYENITE (Minex 7, from Kraft Chemical Co., Chicago, IL) |

15 wt. % water was added over a period of one minute. The water was dispersed throughout the mixture by mixing for approximately an additional 15 minutes with the Eirich machine cylindrical container rotating at about 66 rpm and the impeller rotating at about 2230 rpm. The impeller rotation was subsequently reduced to about 1115 rpm for about 20 minutes. The result was agglomerated particles predominately having a diameter of from about 0.85 to about 0.425 mm. The particles were dried for about 16 hours at approximately 125° C.

A mixture of 86 wt. % dried agglomerated particles and 14 wt. % fine (i.e., less than about 45 micrometers) aluminum hydroxide (Solem Industries, Norcross, Ga.) was fed into a tube kiln rotating at about 3 rpm, inclined at about a 2 degree angle to horizontal, and operated at a firing temperature of about 1315° C. The kiln length was about 213 cm and kiln diameter was about 14 cm. The fired particles were subsequently screened to remove any excess parting agent. The screening process produced particles primarily having a diameter from about 0.85 to about 0.425 mm in diameter. The particles were white and had a specific gravity of about 3.15 and a loose bulk density of about 1.6 g/cc. The particles showed less than 15% wt. fines and could be separated after 69 MPa pressure (crush resistance test).

Other properties were generally consistent with the particles described in U.S. Pat. No. 4,680,230.

EXAMPLE 2

Brown anti-skid particles were prepared as follows:

A dry blend of the following materials, having particle sizes which pass through screen openings of about 45 micrometers, were mixed for about 3 minutes in an Eirich Machine Inc. RV02 Mix Pelletizer:

| Wt. % | Material |
|---|---|
| 50.0 | Calcined Alumina (A-2, Grade −44 μm, from Alcoa Alumina Co., Bauxite, Arkansas) |
| 2.5 | Bentonite Clay (VOLCLAY 200, from American Colloid Co., Skokie, IL) |
| 47.5 | NEPHELINE SYENITE (Kylo-LR, Grade 98%, −44 μm, Minnesota Mining and Manufacturing Company, St. Paul, Minnesota) |

16.1% wt. % water was added over a period of 45 seconds. The water was dispersed throughout the mixture by mixing for approximately an additional 5 minutes with the Eirich machine cylindrical container rotating at about 66 rpm and the impeller rotating at about 2230 rpm. The impeller rotation was subsequently reduced to about 1115 rpm for about 3 minutes. The result was agglomerated particles predominately having a diameter of from about 0.85 to about 0.425 mm. The particles were dried for about 16 hours at approximately 125° C.

A mixture of 80 wt. % dried agglomerated particles and 20 wt. % coarse (i.e., less than about 150 micrometers but more than 45 micrometers) calcined alumina (A-2 from Alcoa Alumina Co.) was fed into a tube kiln rotating at about 2 rpm, inclined at about a 1 degree angle to horizontal, and operated at a firing temperature of about 1206° C. The kiln length was about 213 cm and kiln diameter was about 14 cm. The fired particles were subsequently screened to remove any excess alumina By excess alumina is meant alumina which failed to associate with a particle. The screening process produced particles primarily having a diameter from about 0.85 to about 0.425 mm in diameter. The particles were brown and had a specific gravity of about 2.80 and a loose bulk density of about 1.29 g/cc. Less than 22% particles could be screened at 69 MPa.

Other properties were generally consistent with the particles described in U.S. Pat. No. 4,680,230. Coarse alumina was attached onto the surface of the particles to form a rough surface.

EXAMPLE 3

A pavement marking tape of this invention was constructed by coating a liquid polyurethane coating onto a calendered acrylonitrile rubber sheet, dropping on ceramic spheroids of Example 1 above, which became embedded in the coating layer. Subsequently, the liquid polyurethane coating was cured to a hard, dry film. In particular, an acrylonitrile rubber sheet with the following composition was made by mixing the ingredients together in approximately the following proportions in an internal mixer (a Farrel-Banbury mixer) at about 50 rpm and about 135° C. for about 5 minutes:

| | |
|---|---|
| Acrylonitrile-butadiene non-crosslinked elastomer precursor ("Hycar 1022" supplied by B. F. Goodrich) | 100 parts |
| Chlorinated paraffin ("Chlorowax 70-S" supplied by Diamond Shamrock) | 70 parts |
| Chlorinated paraffin ("Chlorowax 40") | 5 parts |
| Polyester fibers ("minifibers") ¼ × 3 denier, supplied by Minifiber, Inc., Johnson City, TN | 10 parts |
| Polyethylene Fibers (fibers of high-density pol-ethylene having molecular weight ranging between 30,000 and 150,000) | 20 parts |
| Titanium dioxide pigment | 130 parts |
| Talc platelet filler particles averaging 2 micrometers in size and having a surface area of 25 square meters per gram | 100 parts |
| Transparent glass microspheres averaging about 100 micrometers in diameter and having an index of refraction of 1.5 | 280 parts |
| Spherical silica reinforcing filler ("Hisil 233" supplied by PPG Industries) | 20 parts |
| Stearic acid release agent | 3.5 parts |
| Ultramarine Blue | 0.5 parts |
| Chelator ("Vanstay SC" supplied by R. T. Vanderbilt, Inc.) | 0.5 parts |

After removal from the Banbury mixer, the mixture of materials was milled to a thickness of about 12.7 mm on a two roll rubber mill. Then, thickness was further reduced to about 1.3 mm in a calendar stack operating at temperature of about 85° C. to about 90° C. The mixture of materials traveled between the rollers at a rate of about 13.7 to about 15.3 meters per minute. The calendered web was wound into rolls with a polyethylene film interliner.

Sheets of the above web (referred to as a "premix") were unwound from the roll and coated with a solution of a liquid or uncured polyurethane resin mixture of approximately the following composition:

| | |
|---|---|
| Scotchlite 4430 polyurethane coating (Minnesota Mining and Manufacturing Company, St. Paul, MN) | 50 parts |
| EXP03 White (TiO$_2$) pigment Dispersion (Harwick Chemical Corp., Akron, Ohio) | 20 parts |
| 4430B Catalyst (Zinc Hexogen) (Minnesota Mining and Manufacturing Company, St. Paul, MN) | 0.5 parts |

The above solution was coated onto the premix or web at a thickness of about 0.254 mm and air dried to a tacky state. At ambient conditions, the pre-drying generally required from about 10 to 15 minutes. The spheroids of Example 1 were distributed over the tacky surface of the polyurethane at a rate of 48.8 g/sq. m. and the construction was dried and cured for 10 minutes at 121° C. Retention of the spheroids may also be improved by silane treatment.

A polybutadiene rubber pressure sensitive adhesive (specifically, PM 7701 from Minnesota Mining and Manufacturing Company, St. Paul, Minn.) was laminated to the backside of the premix completing the product construction.

EXAMPLE 4

A pavement-marking tape of this invention was prepared by the method of Example 3, except that spheroids prepared in Example 2 were substituted for the spheroids of Example 1.

EXAMPLE 5

A pavement-marking tape of this invention was prepared by the method of Example 3, except that spheroids prepared in Example 2 were extensively tumbled, screened to remove most of the fines, and subsequently substituted for the spheroids of Example 1.

EXAMPLE 6

A pavement-marking tape was prepared, for comparative purposes, by substituting sand for the spheroids of Example 1 in a pavement-marking tape prepared by the method of Example 3.

EXAMPLE 7

A pavement-marking tape was prepared, for comparative purposes, by substituting alumina for the spheroids of Example 1 in a pavement-marking tape prepared by the method of Example 3.

Portions of the products of Examples 3 through 7 were tested for skid-resistance and durability. The portions of each product were similarly exposed to traffic. The comparative results are presented in FIGS. 2 or 3. Each data point represents the anti-skid properties observed after exposure time as tested on a British Skid Resistance Tester.

Figure 2:
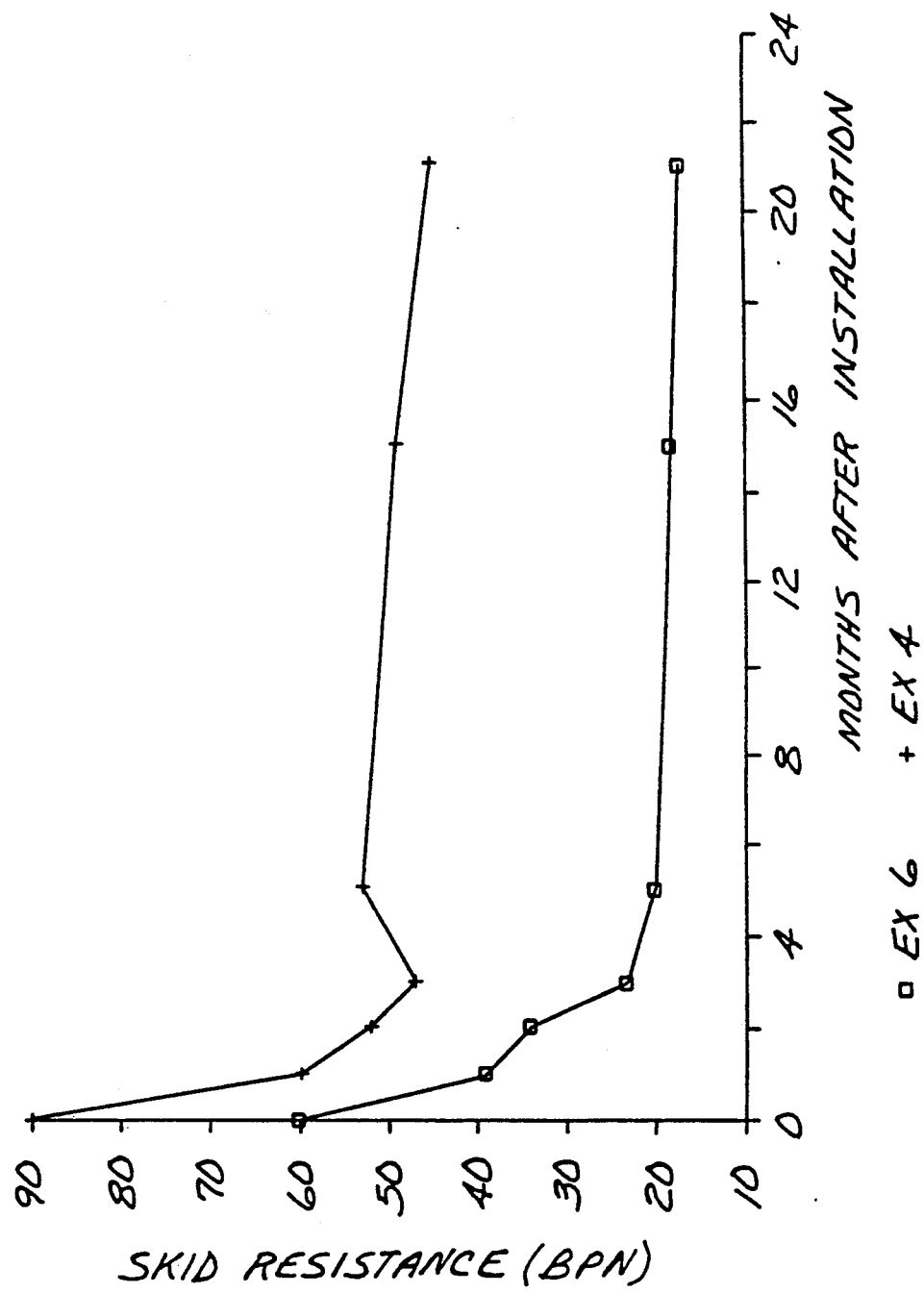
FIG. 2 is a graph of skid-resistance of a pavement marking tape of this invention and a comparative tape of sand over extended time.

In FIG. 2, portions of the pavement marking tapes from Example 4 and 6 are compared. The tape including spheroids (Example 4) has an initial skid-resistance of about 90 BPN while the tape including sand (Example 6) has an initial skid-resistance of about 60 BPN. Both tapes show a decrease in skid-resistance in the first 3 months of exposure to traffic and more constant skid-resistance properties from about 5 months to the termination of the test at about 22 months.

However, skid-resistance properties of the spheroid embedded tape (Example 4) during the 5 to 22 month period fall generally within the range of about 45 to about 53 BPN while the sand embedded tape (Example 6) is within the much lower range of about 18 to 20 BPN. Thus, the spheroid embedded tape (Example 4) is initially more skid-resistant and maintains a superior level of skid-resistance relative to the sand embedded tape (Example 6). Further, the skid-resistance, for the spheroid embedded tape, (Example 4) during the 5 to 22 month period is approximately half of the initial skid-resistance, while the sand embedded tape (Example 6) shows only about one-third of the initial skid-resistance. Thus, the spheroid embedded pavement marking tapes are more durable in skid-resistance in this test than the sand embedded pavement marking tape. Additionally, more than 80% of the spheroids were retained on the coated surface in this test.

Figure 3:
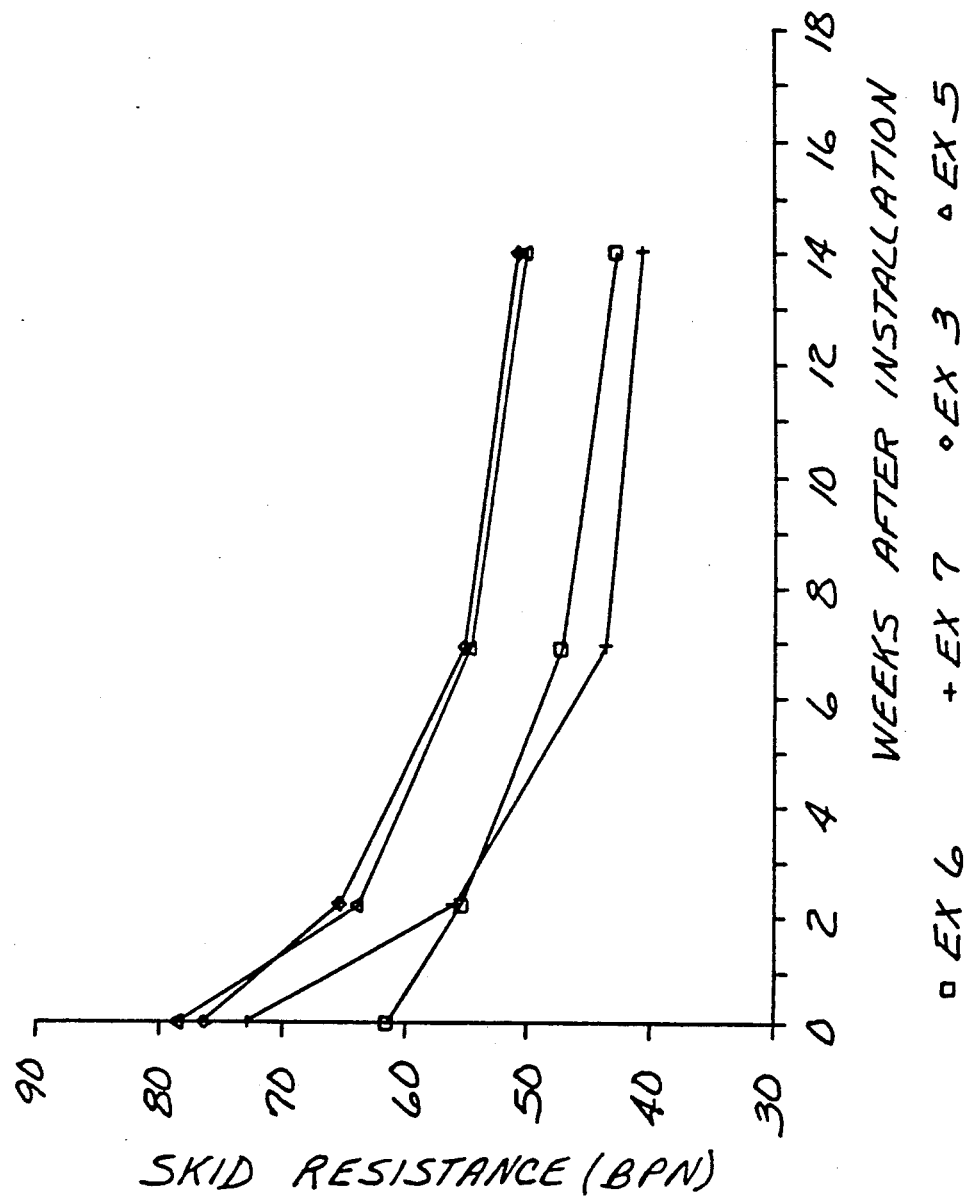
FIG. 3 is a graph of skid-resistance of 2 pavement marking tapes of this invention and 2 tapes of conventional skid-resistant particles over time.

In FIG. 3, pavement marking tape having embedded spheroids prepared with a fine parting agent, Aluminum Hydroxide less than 45 micrometers (Example 3) is compared to tapes having embedded sand or alumina. The spheroid tape (Example 3) has an initial skid-resistance of about 77 BPN and drops to about 56 BPN in seven weeks of exposure to traffic. By comparison, the sand embedded tape (Example 6) drops from an initial skid-resistance of about 62 BPN to about 48 BPN by seven weeks. The alumina embedded tape (Example 7) drops from an initial skid-resistance of about 73 BPN to about 44 BPN by seven weeks. Thus, the spheroid embedded tape of Example 3 exceeds the performance of the comparison tapes of Examples 6 and 7. Further, the alumina embedded tape Example 7 although initially nearing the spheroid embedded tape Example 3 in skid-resistance quickly drops in skid-resistance to levels slightly below the sand embedded tape. A tape with extensively tumbled particles from Example 5 is also shown and generally duplicates the results from Example 3.

Colors other than white may be prepared by applying a surface color coating to the ceramic spheroids. For example, the preferred particles may be colored orange to indicate the presence of a construction work zone, or blue to indicate the presence of a handicapped parking zone, or yellow to indicate a traffic lane boundary, or black to visually blend into asphalt pavement or contrast with a light colored pavement. A sol of about 33% solids sodium silicate in water having a $SiO_2/Na_2O$ ratio of about 2.75 could be added to the spheroids of Example 1 (weight ratio of about 3.5% sol to 96.2% spheroids) and mixed in a Hobart Mixer for about 1 minute. The particles should be previously pre-heated to 120° C. Color pigment powder may then be added while stirring for approximately another minute. For example, addition of at least about 5% lead molybdate will result in orange particles, or at least about 1% cobalt oxide will result in blue particles,, or at least about 5% yellow iron oxide pigment optionally replaced in part or totally by lead chromate will result in yellow particles, or at least about 5% carbon black will result in black particles. The resulting mixture could be dried at 230° C. and the excess pigment removed by screening. By excess pigment is meant any pigment not adhering to the particles and capable of passing through the openings of the screen. Additional coats can be applied to achieve a thicker color coating.

Alternatively, the preferred particles could be colored throughout the ceramic portion, by inclusion of various trace amounts of materials in the ceramic mixture For example, inclusion of a small amount of iron impurities causes a brown color, or inclusion of a small amount of cobalt oxide causes a blue color, or lead antimonate or lead chromate causes a yellow color. Other colors are available by reviewing Eppler, R. A., Ceramic Bulletin, vol. 66, no. 11, pp. 1600–1604 (1987); DCMA Classification and Chemical Description of the Mixed Metal Oxide Inorganic Colored Pigments, 2d ed., Metal Oxides and Ceramic Colors Subcommittee, Dry Color Manufacturers Assn., Arlington, Virginia (1982); and C. W. Parmelae, *Ceramic Glazes* (1951), Industrial Publications, Chicago, Ill.

EXAMPLE 8

High alumina content ceramic spheroids fired at 1530° C. were prepared as follows:

A dry blend of the following materials were mixed for about two minutes in an Eirich Machine Inc. RVO2 Mix Pelletizer:

| Ingredient | Amount (grams) |
| --- | --- |
| Alcoa Calcined Alumina A-14 (−44 μm grade) | 4496 |
| Evans Clay Company Snobrite Clay | 431 |
| Beaverwhite Talc | 131 |
| Nyco Company Wollastonite | 190 |

Rotor speed was 2230 rpm, and pan speed was 66 rpm.

201 grams of sodium silicate solution (39.4% solids, 2.75 ratio of silicon oxide to sodium oxide) was combined with 624 grams of water. This solution was added to the pelletizer during the blending. Mixing continued for an additional 3 minutes.

An additional 150 grams of water was added in 50 gram increments every two minutes. The rotor speed was subsequently reduced to 1115 rpm for about 15 minutes. The resulting material was placed on an aluminum tray and dried for 16 hours at 120° C. After this, the material was screened to −1.4 mm and +0.35 mm. The screened material was mixed with 40 parts by weight of $Al(OH)_3$, Solem Industries, by shaking gently in a sealed glass jar. The particles were then poured onto a ceramic plate to a depth of about 3 cm. The plate was placed into a muffle furnace and fired at 3° C. per minute to 1530° C., maintained at 1530° C. for 4 hours, and then cooled at 3° C. per minute to room temperature. The fired particles were screened between 0.833 mm and 0.417 mm. The particles had a spherical shape and a specific gravity of 3.59 g/cm$^3$. For particles having a diameter of less than 0.42 mm, 21% of the particles were crushed at 69 MPa. For particles having a diameter of less than 0.297 mm, 12% of the particles were crushed at 69 MPa.

EXAMPLE 9

High alumina content ceramic spheroids fired at 1540° C. were prepared as follows:

A dry blend of the following materials were mixed for about two minutes in an Eirich Machine Inc. RVO2 Mix Pelletizer:

| Ingredient | Amount (grams) |
| --- | --- |
| Alcoa Calcined Alumina A-14 (−44 μm grade) | 4496 |
| Evans Clay Company Snobrite Clay | 431 |
| Beaverwhite Talc | 131 |
| Nyco Company Wollastonite | 190 |

Rotor speed was 2230 rpm, and pan speed was 66 rpm.

201 grams of sodium silicate solution (39.4% solids, 2.75 ratio of silicon oxide, $SiO_2$, to sodium oxide NaO,) was combined with 624 grams of water. This solution was added to the pelletizer during the blending. Mixing continued for an additional 3 minutes.

An additional 150 grams of water was added in 50 gram increments every two minutes. The rotor speed was subsequently reduced to 1115 rpm for about 15 minutes. The resulting material was placed on an aluminum tray and dried for 16 hours at 120° C. After this, the material was screened to −1.4 mm and +0.35 mm. The screened material was mixed with 40 parts by weight of $Al(OH)_3$, Solem Industries, by shaking gently in a sealed glass jar. The particles were then poured onto a ceramic plate to a depth of about 3 cm. The plate was placed into a muffle furnace and fired at 3° C. per minute to 1540° C., maintained at 1540° C. for 4 hours, and then cooled at 3° C. per minute to room temperature. The fired particles were screened between 0.833 mm and 0.417 mm. The particles had a spherical shape and a specific gravity of 3.57 g/cm$^3$. For particles having a diameter of less than 0.42 mm, 14% of the particles were crushed at 69 MPa. For particles having a diameter of less than 0.297 mm, 8% of the particles were crushed at 69 MPa.

EXAMPLE 10

Pavement marking tapes of the present invention were prepared using the ceramic spheroids of Example 8. A liquid polyurethane was coated onto a calendered, flexible acrylonitrile rubber sheet. The polyurethane included the following ingredients:

| Ingredient | | Parts By Weight |
| --- | --- | --- |
| Tone 0301 | polycaprolactone triol having a molecular weight of 303 available from Union Carbide Company | 100 |
| Tone 0310 | polycaprolactone triol having a molecular weight of 966 available from Union Carbide Company | 10 |
| titanium dioxide pigment | | 64.5 |
| Desmodur N-100 | biuret adduct of 1,6 hexamethylene diisocyanate available from Mobay Chemical Division of U.S. Bayer | 205 |

The first three ingredients listed above were thoroughly mixed using a high speed, low shear Cowles Dissolver mixing device available from C. Cowles and Company, New Haven, Connecticut. Next, the resulting mixture was combined with Desmodur N-100 and coated 8 mils thick onto the rubber sheet. After curing the coating for 3 minutes at 150° C., the ceramic spheroids were sprinkled over the surface of the polyurethane coating. Cure was completed at 163° C. for 2 minutes.

The resulting pavement marking material was tested for initial skid resistance on a British Skid Resistance Tester. The sample showed an average initial skid resistance of 81 BPN over three trials.

EXAMPLE 11

Pavement marking tapes of the present invention were prepared using the ceramic spheroids of Example 9. A liquid polyurethane was coated onto a calendered, flexible acrylonitrile rubber sheet. The polyurethane included the following ingredients:

| Ingredient | | Parts By Weight |
| --- | --- | --- |
| Tone 0301 | polycaprolactone triol having a molecular weight of 303 available from Union Carbide Company | 100 |
| Tone 0310 | polycaprolactone triol having a molecular weight of 966 available from Union Carbide Company | 10 |
| titanium dioxide pigment | | 64.5 |
| Desmodur N-100 | biuret adduct of 1,6 hexamethylene diisocyanate available from Mobay Chemical Division of U.S. Bayer | 205 |

The first three ingredients listed above were thoroughly mixed using a high speed, low shear Cowles Dissolver mixing device available from C. Cowles and Company, New Haven, Connecticut. Next, the resulting mixture was combined with Desmodur N-100 and coated 8 mils thick onto the rubber sheet. After curing the coating for 3 minutes at 150° C., the ceramic spheroids were sprinkled over the surface of the polyurethane coating. Cure was completed at 163° C. for 2 minutes.

The resulting pavement marking material was tested for initial skid resistance on a British Skid Resistance Tester. The sample showed an average initial skid resistance of 74 BPN over three trials.

EXAMPLE 12

Three pavement marking samples of the present invention were prepared using the ceramic spheroids commercially available as Aluma Sand from Diamonite Products Manufacturing, Incorporated. Each of the samples was prepared as follows:

A liquid polyurethane was coated onto a calendered, flexible acrylonitrile rubber sheet. The polyurethane included the following ingredients:

| Ingredient | | Parts By Weight |
| --- | --- | --- |
| Tone 0301 | polycaprolactone triol having a molecular weight of 303 available from Union Carbide Company | 100 |
| Tone 0310 | polycaprolactone triol having a molecular weight of 966 available from | 10 |

| Ingredient | | Parts By Weight |
|---|---|---|
| | Union Carbide Company | |
| titanium dioxide pigment | | 64.5 |
| Desmodur N-100 | biuret adduct of 1,6 hexamethylene diisocyanate available from Mobay Chemical Division of U.S. Bayer | 205 |

The first three ingredients listed above were thoroughly mixed using a high speed, low shear Cowles Dissolver mixing device available from C. Cowles and Company, New Haven, Conn. Next, the resulting mixture was combined with Desmodur N-100 and coated 8 mils thick onto the rubber sheet. After curing the coating for 3 minutes at 150° C., the ceramic spheroids were sprinkled over the surface of the polyurethane coating. For the first sample, the ceramic spheroids were untreated. For the second sample, the ceramic spheroids were surface treated with A1100 Silane, Union Carbide Company. For the third sample, the ceramic spheroids were first surface treated with a mixture of A1100 Silane followed by a second surface treatment with FC129, a fluorochemical surfactant available from Minnesota Mining and Manufacturing Company, St. Paul, Minn. Cure was completed at 163° C. for 2 minutes.

The resulting pavement marking material was tested for initial skid resistance on a British Skid Resistance Tester. The skid resistance results shown below are an average of three trials:

| Sample | Surface Treatment | Average Skid Resistance (BPN) |
|---|---|---|
| 1 | none | 67 |
| 2 | A1100 | 61 |
| 3 | A1100/FC129 | 69 |

Although the present invention has been described with reference to preferred embodiments, workers skilled in the art will recognize that changes may be made in form and detail without departing from the spirit and scope of the invention.

What is claimed is:

1. A skid-resistant, surface marking material, comprising:
   (a) a polymer matrix phase having a top surface; and
   (b) a plurality of opaque, skid-resistant ceramic spheroids partially embedded in and protruding from the top surface of the polymer matrix phase, wherein said ceramic spheroids have rounded surfaces and no substantial points, and wherein said ceramic spheroids have a Krumbein roundness of at least 0.8.

2. The skid-resistant, surface marking material of claim 1, wherein said ceramic spheroids comprise 3 to 97 parts by weight of a vitreous matrix phase and 3 to 97 parts by weight of a crystalline phase.

3. The skid-resistant, surface marking material of claim 2, further comprising a base sheet underlying the polymer matrix phase.

4. The skid-resistant, surface marking material of claim 2, wherein the vitreous matrix phase comprises a material selected from the group consisting of nepheline syenite, basalt, feldspar, shale, argillite, pyroxene, talc, wollastonite, and mixtures thereof.

5. The skid-resistant, surface marking material of claim 2, wherein the vitreous matrix phase comprises a clay material.

6. The skid-resistant, surface marking material of claim 5, wherein the clay is selected from the group consisting of kaolin, bentonite, and mixtures thereof.

7. The skid-resistant, surface marking material of claim 2, wherein the crystalline phase comprises a material selected from the group consisting of alumina, mullite, and mixtures thereof.

* * * * *

UNITED STATES PATENT AND TRADEMARK OFFICE
CERTIFICATE OF CORRECTION

PATENT NO. : 5,094,902
DATED : March 10, 1992
INVENTOR(S) : Haenggi et al.

It is certified that error appears in the above-identified patent and that said Letters Patent is hereby corrected as shown below:

Col. 1, lines 39/40, "skidre-sistance" should be --skid-resistance--.

Col. 2, line 33, "pigments" should be --pigments.--.

Col. 5, line 17, "center The" should be --center. The--.

Col. 6, line 40, "for described" should be --for practicing the present invention are the particles described--.

Col. 6, line 41, "No." should be --Nos.--.

Col. 7, line 38, "resins" should be --resins.--.

Col. 9, line 15, "alumina By" should be --alumina. By--.

Col. 12, line 13, "ture For" should be --ture. For--.

Col. 13, line 20, "NaO,)" should be --Na$_2$O)--.

Signed and Sealed this

Twenty-fourth Day of August, 1993

Attest:

BRUCE LEHMAN

*Attesting Officer*    *Commissioner of Patents and Trademarks*